US007010719B2

(12) United States Patent
Nobuyoshi et al.

(10) Patent No.: US 7,010,719 B2
(45) Date of Patent: Mar. 7, 2006

(54) EXTERNAL STORAGE DEVICE CAPABLE OF SELECTIVELY STORING DATA IN A SEMICONDUCTOR MEMORY OR A HARD DISK

(75) Inventors: Tanaka Nobuyoshi, Tokio-to (JP); Akihiro Ogura, Kanagawa-ken (JP); Atsuya Takeuchi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 10/288,137

(22) Filed: Nov. 5, 2002

(65) Prior Publication Data

US 2003/0088747 A1    May 8, 2003

(30) Foreign Application Priority Data

Nov. 5, 2001  (JP) .............................. 2001-339706

(51) Int. Cl.
G06F 11/00 (2006.01)
G06F 13/00 (2006.01)
(52) U.S. Cl. .............................. 714/6; 714/14; 714/15; 714/24; 710/68; 713/320; 711/170
(58) Field of Classification Search ................ 711/170, 711/171, 172, 173, 154, 156, 158, 202; 714/14, 714/22, 24, 15, 6, 7; 708/203; 710/220, 710/240, 68; 713/320
See application file for complete search history.

(56) References Cited

U.S. PATENT DOCUMENTS

| | | | | |
|---|---|---|---|---|
| 5,548,740 A | * | 8/1996 | Kiyohara | 345/543 |
| 5,559,978 A | * | 9/1996 | Spilo | 711/203 |
| 5,694,619 A | * | 12/1997 | Konno | 710/68 |
| 5,699,539 A | * | 12/1997 | Garber et al. | 711/2 |
| 5,742,742 A | * | 4/1998 | Ueda | 358/1.9 |
| 5,812,817 A | * | 9/1998 | Hovis et al. | 711/173 |
| 5,950,013 A | * | 9/1999 | Yoshimura et al. | 710/5 |
| 6,145,069 A | * | 11/2000 | Dye | 711/170 |
| 6,173,381 B1 | * | 1/2001 | Dye | 711/170 |
| 6,611,919 B1 | * | 8/2003 | Matsuya et al. | 713/320 |

FOREIGN PATENT DOCUMENTS

JP    2001-244021    9/2001

* cited by examiner

*Primary Examiner*—Hong Kim
(74) *Attorney, Agent, or Firm*—Robert B. Martin; Abdy Raissinia; Dillon & Yudell LLP (57) ABSTRACT

An external storage device 110 includes a semiconductor memory 200, a hard disk 210 having an access speed lower than that of the semiconductor memory 200, a judgment part 275 for determining whether or not data can be stored in the semiconductor memory 200, and an access processing part 277 for compressing and storing data into the semiconductor memory 200 after it is determined that the data can be stored in the semiconductor memory 200, and for storing the write data into the hard disk 210 when it is determined that the data cannot be stored in the semiconductor memory 200. The storage capacity of the external storage device 110 is larger than the storage capacity of the semiconductor memory 200.

7 Claims, 8 Drawing Sheets

EXTERNAL STORAGE DEVICE CAPABLE OF SELECTIVELY STORING DATA IN A SEMICONDUCTOR MEMORY OR A HARD DISK

RELATED PATENT APPLICATION

The present patent application claims priority to co-pending Japanese Application No. 2001-339706, filed on Nov. 5, 2001.

BACKGROUND OF THE INVENTION

1. Technical Field

The present invention relates to storage devices in general, and in particular to an external storage device a computer network.

2. Description of the Related Art

Hard disks are often used to store data processed by a computer system. Generally speaking, a hard disk has a relatively low cost per bit and a relatively high storage capacity. However, since a hard disk relies upon mechanical actions such as rotation of a disk or movement of a magnetic head for reading and writing data, the access speed of the hard disk is much slower than a solid state storage device that is capable of reading and writing data electrically.

A semiconductor disk device is capable of compressing and writing data. However, since the efficiency of data compression depends on the contents of data being compressed, it is very difficult to provide the semiconductor disk device as an external storage device with a specific storage capacity larger than a semiconductor memory included therein.

Consequently, it would be desirable to provide an improved external storage device that is capable of storing data efficiently in a cost-effective manner.

SUMMARY OF THE INVENTION

In accordance with a preferred embodiment of the present invention, an external storage device for storing data comprises a first recording medium, a second recording medium having an access speed lower than that of the first recording medium, a judgment part for determining whether data can be stored in the first recording medium, and an access processing part for compressing and storing the data in the first recording medium after it is determined that the data can be stored in the first recording medium, and for storing the data in the second recording medium after it is determined that the data cannot be stored in the first recording medium, and the external storage device provides a storage area with a large storage capacity as compared with a storage capacity of the first recording medium.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
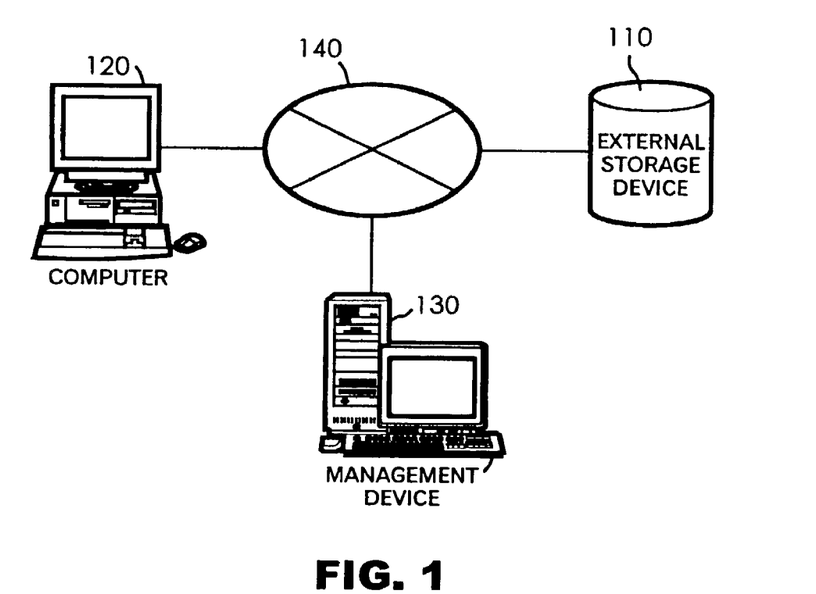
FIG. 1 is a diagram of a computer network configuration according to a preferred embodiment of the present invention.

Referring now to the drawings and, in particular, to FIG. 1, there is illustrated a diagram of a computer network configuration, in accordance with a preferred embodiment of the present invention. As shown, a computer network configuration 100 includes an external storage device 110, a computer 120, a management device 130, and a network 140. The external storage device 110 is an external storage device for storing data and instructions. The external storage device 110 preferably uses a volatile semiconductor memory of 2 GB as a first recording medium, and a nonvolatile recording medium of 18 GB as a second recording medium. The volatile semiconductor memory can be a static random access memory (SRAM) or a dynamic random access memory (DRAM). The nonvolatile semiconductor memory can be a flash memory or an IC card memory, an optical recording medium such as a DVD or PD, a magneto-optical recording medium such as an MD, a magnetic recording medium such as a hard disk, a tape medium or the like. The access speed of the second recording medium is preferably lower than that of the first recording medium.

The computer 120 executes an application program, and accesses the external storage device 110 through the network 140 in accordance with instructions of the application program. The management device 130 is a computer used by an administrator of the computer network configuration 100 to manage the external storage device 110. The management device 130 transmits and receives a message for management to and from the external storage device 110. As an example of the message for management, the management device 130 and the external storage device 110 support an Simple Network Management Protocol (SNMP).

The network 140 is a local-area network for connecting the external storage device 110, the computer 120, and the management device 130 to each other. The management device 130 may be a public line network such as the Internet or telephone line, a dedicated communication network such as Server Area Network (SAN), or a combination thereof. The computer 120 may be directly connected to the external storage device 110 by using an IDE connection, an E-IDE connection, a SCSI connection, an USB connection, or a fiber channel connection without using the network 140.

Figure 2:
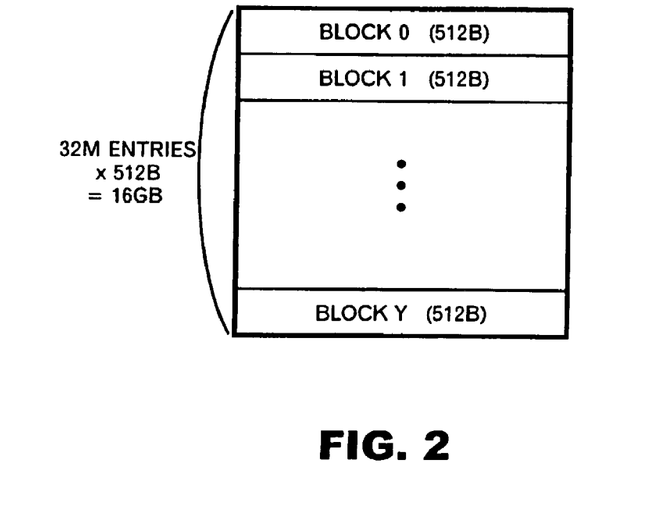
FIG. 2 is a block diagram of a data structure of a storage area provided by an external storage device, according to a preferred embodiment of the present invention.

FIG. 2 shows a data structure of a storage area provided by the external storage device 110. The computer 120 regards the external storage device 110 as a storage device having a storage capacity of 16 GB (512 byte×32 M=16 gigabyte) including 32 mega blocks of 512 bytes. The external storage device 110 provides a storage area having a storage capacity larger than the storage capacity of the first recording medium of the semiconductor memory to the computer 120. The computer 120 uses, as an example of an access to the external storage device 110, a write access of writing data of 512 bytes into a specific block in the external storage device 110, a readout access of reading out data of 512 bytes from a specific block in the external storage device 110, and a capacity readout access of requesting readout of capacity information indicating the storage capacity of the external storage device 110. In the case when data of less than 512 bytes is written into the external storage device 110, the computer 120 makes the write access include size designation of the write data. The external storage device 110 and the computer 120 may support an access in a cluster unit integer times as large as the data block.

Figure 3:
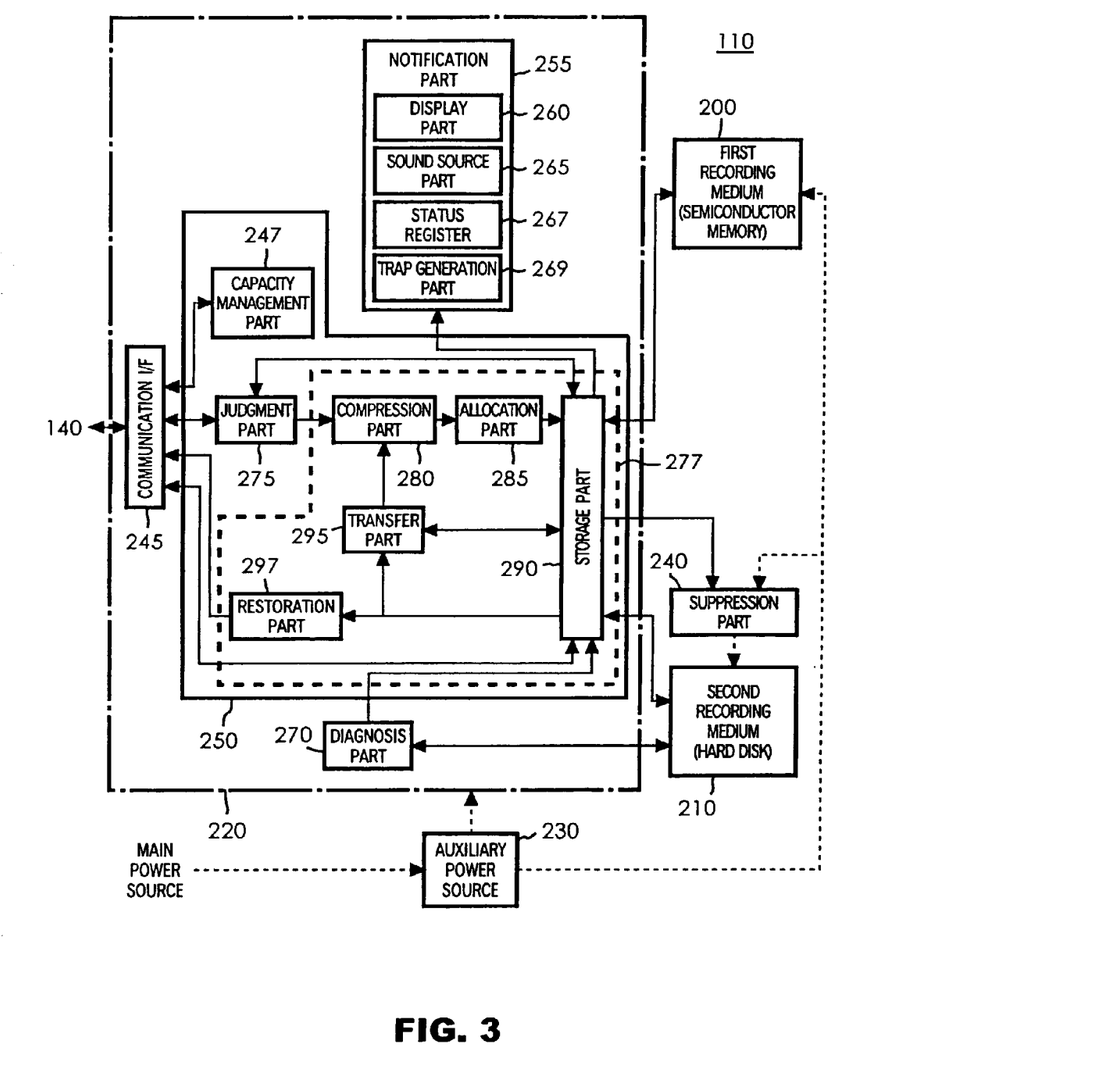
FIG. 3 is a block diagram of an external storage device, according to a preferred embodiment of the present invention.

FIG. 3 is a block diagram of the external storage device 110. The external storage device 110 includes a semiconductor memory 200, a hard disk 210, a control unit 220, an auxiliary power source part 230, and a suppression part 240. The semiconductor memory 200 is an example of the first recording medium. The hard disk 210 is an example of the second recording medium. The semiconductor memory 200 is a volatile semiconductor memory such as a DRAM. The semiconductor memory 200 divides data received from the computer 120 into M blocks (memory blocks), each being a block of 64 bytes before storing them. The semiconductor memory 200 has a capacity of 2 GB. The hard disk 210 is a nonvolatile recording medium. The access speed of the hard disk 210 is lower than that of the semiconductor memory 200. The hard disk 210 divides data received from the computer 120 into H blocks (hard disk blocks), each being a block of 512 bytes before storing them. The hard disk 210 has a capacity of 18 GB.

Under normal conditions, the main power source of external storage device 110 supplies electric power to the semiconductor memory 200, the hard disk 210 and the control unit 220. But when an abnormality occurs in the main power source of the external storage device 110, the auxiliary power source part 230 supplies electrical power to the semiconductor memory 200, the hard disk 210 and the control unit 220. The auxiliary power source part 230 may use a battery or a power source by private power generation. The auxiliary power source part 230 may be an uninterruptable power supply (UPS) that switches over from the main power source to the auxiliary power source at the time of abnormality of the main power source in order to prevent instantaneous interruption of power to the semiconductor memory 200.

The suppression part 240 receives instructions from the control unit 220 to cut off power supply to the hard disk 210, and suppresses power consumption of the hard disk 210. The control unit 220 performs a transmitting/receiving information related to access from the computer 120, an access processing of the semiconductor memory 200 or the hard disk 210 corresponding to the access received from the computer 120, a diagnosis processing of respective functions in the inside of the external storage device 110, and a transmitting/receiving processing of a message for management to and from the management device 130.

The control unit 220 includes a communication interface 245, a control part 250, a notification part 255, and a diagnosis part 270. The communication interface 245 performs the transmitting/receiving processing relating to the access from the computer 120, and the transmitting/receiving processing of the message for management to and from the management device 130. The control part 250 provides a control to an access from the computer 120, a control to an access to the semiconductor memory 200 or the hard disk 210, an acquisition to a consumption of the semiconductor memory 200, or a control to a diagnosis result of the diagnosis part 270. The notification part 255 acquires the consumption of the semiconductor memory 200 from the control part 250. The notification part 255 detects that the consumption of the semiconductor memory 200 exceeds a previously set value, and notifies the administrator of the external storage device 110. The notification part 255 includes a display part 260, a sound source part 265, a status register 267, and a trap generation part 269. The notification part 255 gives notice by using means previously selected by the administrator of the external storage device 110 among the display part 260, the sound source part 265, the status register 267, and/or the trap generation part 269.

The display part 260 shows and gives notice when the consumption of the semiconductor memory 200 exceeds the previously set value. The display part 260 may be an image output device such as a light emitting diode (LED) or a display monitor. The sound source part 265 gives notice by using an alarm sound when the consumption of the semiconductor memory 200 exceeds the previously set value. The diagnosis part 270 may be a sound output device such as a buzzer or a speaker. The status register 267 records excess information indicating that the consumption of the semiconductor memory 200 exceeds the previously set value. The status register 267 is a recording area that the management device 130 can access. In the present embodiment, the status register 267 is a register allocated on Management Information Base (MIB) in the SNMP.

The management device 130 uses a GET REQUEST message in the SNMP to request the external storage device 110 to read out the excess information. The notification part 255 receives the GET REQUEST message of giving an instruction to read out the excess information through the communication interface 245. Then, the notification part 255 reads out the contents of the status register 267 and transmits the contents to the management device 130 through the communication interface 245. When the excess information is recorded in the received contents of the status register 267, the management device 130 notifies the administrator of the external storage device 110 by using a screen or the like that the consumption of the semiconductor memory 200 excesses the previously set value.

The trap generation part 269 transmits to the management device 130 the excess information indicating that the consumption of the semiconductor memory 200 exceeds the previously set value. The trap generation part 269 uses a trap based on the SNMP to transmit the excess information to the management device 130. That is, when the consumption of the semiconductor memory 200 excesses the previously set value, the trap generation part 269 generates the trap including the excess information. Then, the trap generation part 269 transmits the trap packet to the management device 130 through the communication interface 245. After receiving the trap including the excess information from the notification part 255, the management device 130 notifies the administrator of the external storage device 110 by using the screen or the like that the consumption of the semiconductor memory 200 exceeds the previously set value.

When an abnormality occurs in the main power source of the external storage device 110, the diagnosis part 270 conducts diagnosis on whether the hard disk 210 normally operates. The diagnosis part 270 may perform this diagnosis by, for example, performing readout of a specific H block in the hard disk 210 and checking the existence of error occurrence and/or the correctness of readout result. When the abnormality occurs in the main power source of the external storage device 110, the diagnosis part 270 notifies the control part 250 whether the hard disk 210 normally operates.

The control part 250 includes a capacity management part 247, a judgment part 275, and an access processing part 277. After receiving a capacity readout access from the computer 120 through the network 140, the capacity management part 247 returns capacity information indicating a storage capacity larger than the semiconductor memory 200 to the computer 120. The external storage device 110 of the present embodiment has a storage capacity of 16 GB as shown in FIG. 2. Accordingly, the capacity management part 247 returns the capacity information indicating the storage capacity of 16 GB larger than the storage capacity of 2 GB of the semiconductor memory 200 to the computer 120.

Here, the capacity information may not be the storage capacity itself but may be a parameter value used for calculation of the storage capacity. The capacity information may be information including, for example, number of blocks, number of sectors, number of trucks, number of cylinders, and/or block size, instead of the storage capacity itself. Besides, when the computer 120 is connected to the external storage device 110 through SCSI, the computer 120 may acquire the number of blocks and the block size of the external storage device 110 by using a Read Capacity command as an example of the capacity read access.

After receiving a write access of a data block from the computer 120, the judgment part 275 judges whether or not the write object data block can be stored in the semiconductor memory 200. That is, the judgment part 275 initially acquires the number of empty M blocks of the semiconductor memory 200 from a storage part 290 in the access processing part 277. Next, when the number of empty M blocks of the semiconductor memory 200 is 8 or more (that is, the number of M blocks or more in which the data block of 512 bytes can be stored without compression), the judgment part 275 concludes that the object data block can be stored in the semiconductor memory 200. Otherwise, the judgment part 275 may initially cause the object data block to be compressed by a compression part 280 in the access processing part 277 and then makes a conclusion based on whether a sufficient number of empty blocks to store the compressed object data block exists.

The access processing part 277 includes the compression part 280, an allocation part 285, the storage part 290, a transfer part 295, and a restoration part 297. The compression part 280 compresses the object data blocks that are determined to be stored in the semiconductor memory 200 by using compression algorithm such as run-length coding, Huffman coding, or Lempel-Ziv coding. Depending on the compression algorithm or the contents of the object data block, eight or more M blocks are required to store the compressed object data block, and an effect of compressing the object data block cannot be obtained. In such a case, the compression part 280 delivers the object data block to the allocation part 285 without compression. The compression part 280 does not compress the object data blocks that are determined to be stored in the hard disk 210.

The allocation part 285 divides the object data blocks that are determined to be stored in the semiconductor memory 200 into M blocks, the number of which corresponds to the object data block, and allocates the M blocks. That is, the allocation part 285 divides the object data block of 512 bytes, which was not compressed by the compression part 280, into eight M blocks each having a capacity of 64 bytes. Conversely, the allocation part 285 divides the object data block, which was compressed by the compression part 280, into M blocks the number of which corresponds to the size after compression. With respect to the write access of writing data of less than 512 bytes, the allocation part 285 divides the data into M blocks, the number of which is necessary for storage of the object data block. That is, when part of the object data block is not used, the allocation part divides the use portion of the object data block into M blocks. The storage part 290 performs the processing such as the control of the access to the semiconductor memory 200 and the hard disk 210, the acquisition of the consumption of the semiconductor memory 200, or the control to the diagnosis result of the diagnosis part 270.

At the write access, the storage part 290 stores the object data blocks that are determined to be stored in the semiconductor memory 200 into at least one M block allocated by the allocation part 285. Also, at the write access, the storage part 290 stores the object data blocks that are determined to be stored in the hard disk 210 into the hard disk 210. The storage part 290 acquires the consumption of the semiconductor memory 200 after processing the write access and transmits it to the notification part 255. The storage part 290 receives the readout access through the communication interface 245, reads out the object data block from the semiconductor memory 200 or the hard disk 210, and transmits it to the restoration part 297. Specifically, after receiving the readout access, the storage part 290 determines whether the object data block as the readout object data is stored in the semiconductor memory 200 or the hard disk 210. When the object data block is stored in the semiconductor memory 200, the storage part 290 reads out the object data block from the semiconductor memory 200. However, when the object data block is stored in the hard disk 210, the storage part 290 reads out the object data block from the hard disk 210. Then, the storage part 290 transfers the object data block to the restoration part 297.

Further, the storage part 290 obtains the occurrence of abnormality of the main power source and the diagnosis result as to whether the hard disk 210 normally operates from the diagnosis part 270, and performs a fault processing on the basis of the diagnosis result. When the abnormality occurs in the main power source and the hard disk 210 normally operates, the storage part 290 stores the contents of the semiconductor memory 200 into a backup area in the hard disk 210. But when the abnormality occurs in the main power source and the hard disk 210 does not normally operate, the storage part 290 instructs the suppression part 240 to cut off power supply to the hard disk 210, and suppresses power consumption of the hard disk 210. As stated above, the storage part 290 suppresses power consumption of the hard disk 210 when the hard disk 210 does not normally operate, and elongates a connection time of the auxiliary power source part 230 as long as possible. The administrator of the external storage device 110 can store the contents of the semiconductor memory 200 into, for example, a hard disk in the management device 130 by using the management device 130 in the connection time of the auxiliary power source part 230. By this, the administrator of the external storage device 110 can prevent corruption of data stored in the external storage device 110.

When an empty area exists in the semiconductor memory 200, the transfer part 295 stores the data stored in the hard disk 210 into the semiconductor memory 200. That is, the transfer part 295 acquires the number of empty M blocks of the semiconductor memory 200 from the storage part 290. Next, when the number of empty M blocks of the semiconductor memory 200 is 8 or more (i.e., the empty area of the semiconductor memory 200 is 512 bytes or more), the transfer part 295 determines that one of data blocks in the hard disk 210 can be stored in the semiconductor memory 200. After determining that one of the data blocks in the hard disk 210 can be stored in the semiconductor memory 200, the transfer part 295 acquires one of the data blocks in the hard disk 210 through the storage part 290. Then, the transfer part 295 compresses the object data block by using the compression part 280 and the allocation part 285, and uses the storage part 290 to store it into the semiconductor memory 200. After the object data block read out from the semiconductor memory 200 in response to the readout access from the computer 120 is compressed, the restoration part 297 restores the object data block. The restoration part 297 then returns the object data block of the readout access to the computer 120.

Figure 4:
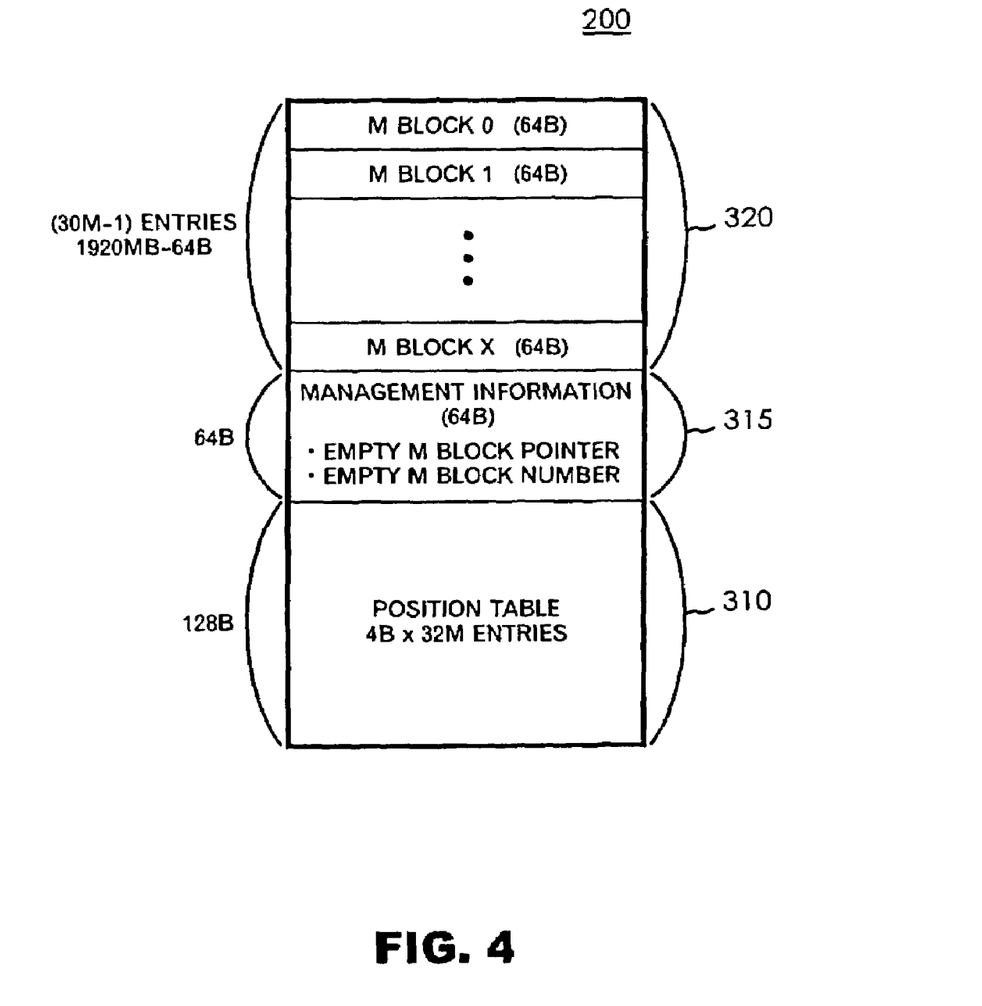
FIG. 4 is a block diagram of a data structure of a semiconductor memory, according to a preferred embodiment of the present invention.

FIG. 4 is a block diagram of a data structure of the semiconductor memory 200, in accordance with a preferred embodiment of the present invention. The semiconductor memory 200 includes a position table 310, management information 315, and an M block area 320. The position table 310 causes information of 4 bytes indicating a storage position of a data block stored in the external storage device 110 to correspond to each of the blocks of the external storage device 110 shown in FIG. 2 and stores it. The position table 310 includes 32 M blocks, and takes an area size of 128 MB (4 bytes×32 M entries). The information of 4 bytes of each entry includes information indicating whether the data block is stored in the semiconductor memory 200 or the hard disk 210, information indicating whether the data block is compressed, and information indicating the number of the M block in which the data block is stored. Alternatively, the storage part 290 may store the position table 310 and/or the management information 315 into a recording medium different from the semiconductor memory 200.

The management information 315 stores management information of 64 bytes used for managing the external storage device 110. The management information 315 includes an empty M block pointer to indicate an empty M block, and an empty M block number. The empty M block pointer indicates one of unused M blocks. The storage part 290 stores the unused M blocks in a one-way list form in which the beginning is indicated by the empty M block pointer. That is, the storage part 290 couples the unused M blocks with each other by writing link information indicating the number of a next unused M block into an unused M block and forms a one-way list. Then, the storage part 290 stores the number of the M block positioned at the beginning of the one-way list of the unused M blocks into the empty M block pointer. When writing the object data block into the semiconductor memory 200, the storage part 290 may use a necessary number of M blocks from the beginning of the list of the empty M blocks. The storage part 290 may add an M block that becomes unnecessary as the result of writing of the object data block in the semiconductor memory 200, to, for example, the beginning of the list of the empty M blocks.

In order to facilitate securement of continuous empty M blocks, the storage part 290 may periodically rearrange the one-way list of empty M blocks in sequence of M block number. For example, the storage part 290 may periodically move active M blocks so that empty M blocks are arranged as continuously as possible.

The empty M block number stores the number of unused M blocks. When acquiring an empty M block from the list of empty M blocks, or adding an empty M block into the list of empty M blocks, the storage part 290 updates the empty M block number. Alternatively, the management information 315 may store the empty M blocks by using a method of using a bit map having bits each corresponding to an M block and becoming "1" when the M block is empty.

The M block area 320 is a data area of M blocks stored in the semiconductor memory 200. The M block area 320 stores (30 M−1) M blocks of 64 bytes. Accordingly, the area size of the M block area 320 becomes 1920 MB−64 bytes (30 M×64 bytes−64 bytes). The numbers of 0 to X (X=30 M−2) are allocated to the M blocks and the M blocks are identified by using the numbers.

Figure 5:
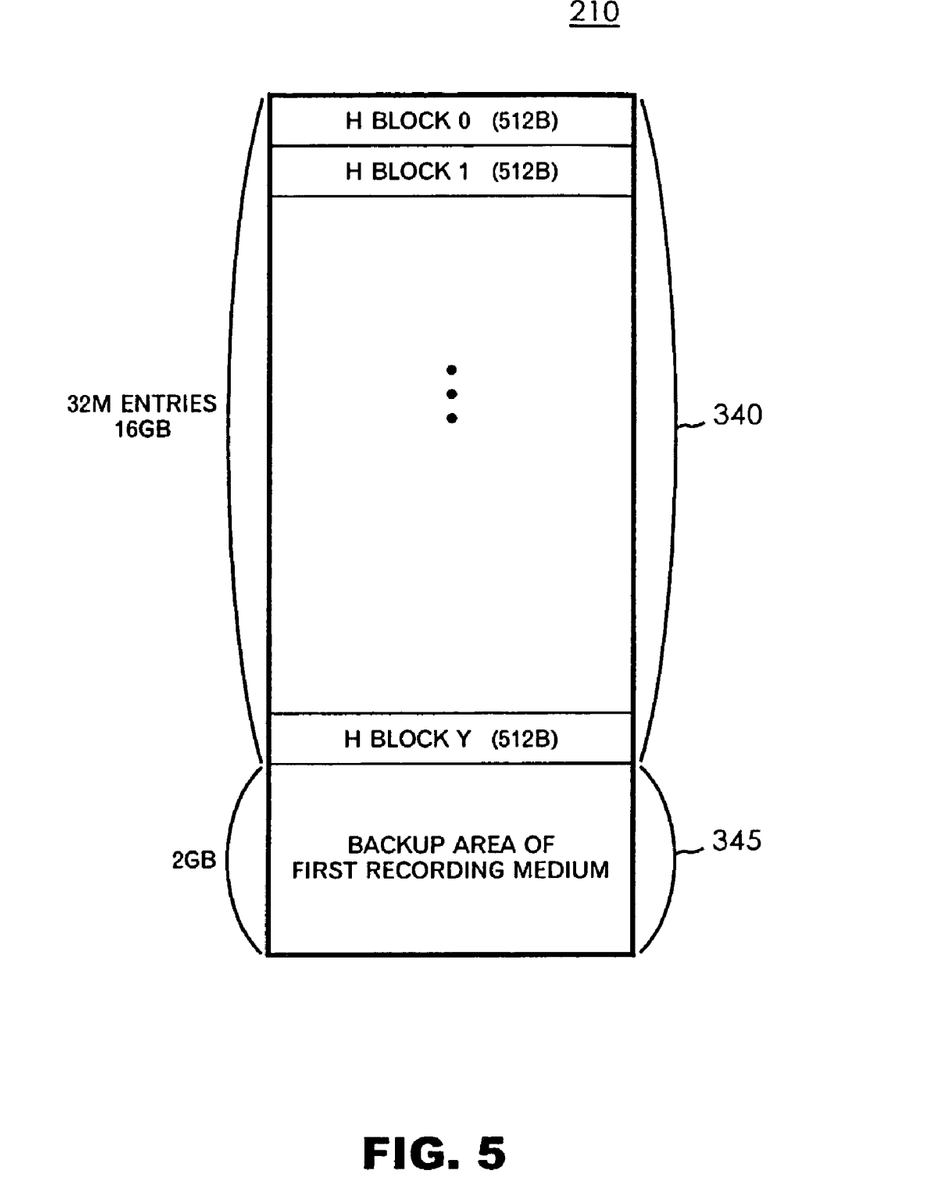
FIG. 5 is a block diagram of a data structure of a hard disk according to a preferred embodiment of the present invention.

FIG. 5 is a block diagram of a data structure of the hard disk 210, in accordance with a preferred embodiment of the present invention. The hard disk 210 includes an H block area 340 and a backup area 345. The H block area 340 is a data area of H blocks stored in the hard disk 210. The H block area 340 stores 32 M H blocks of 512 bytes. Accordingly, the size of the H block area 340 is 16 GB (32 M×512 bytes). The numbers of 0 to Y (Y=32 M−1) are allocated to the H blocks, and the blocks are identified by using the numbers. The H block area 340 is an area on the hard disk 210 used for storing the object data block of the write access from the computer 120. The H block area 340 has the same structure as the data structure of the external storage device 110 shown in FIG. 2. When receiving the capacity readout access from the computer 120, the capacity management part 247 returns capacity information indicating the capacity of the H block area 340 to the computer 120. Alternatively, the capacity management part 247 may return capacity information indicating the capacity except the area used for management of files stored in the H block area 340 to the computer 120.

The backup area 345 is an area used for backup of data in the semiconductor memory 200. When the power source of the external storage device 110 is turned OFF, the storage part 290 stores the data of the semiconductor memory 200 into the backup area 345. When the power source of the external storage device 110 is turned ON, the storage part 290 stores the data of the backup area 345 into the semiconductor memory 200. In the case when an abnormality occurs in the main power source and the hard disk 210 normally operates, the storage part 290 stores the contents of the semiconductor memory 200 into the backup area 345.

Figure 6:
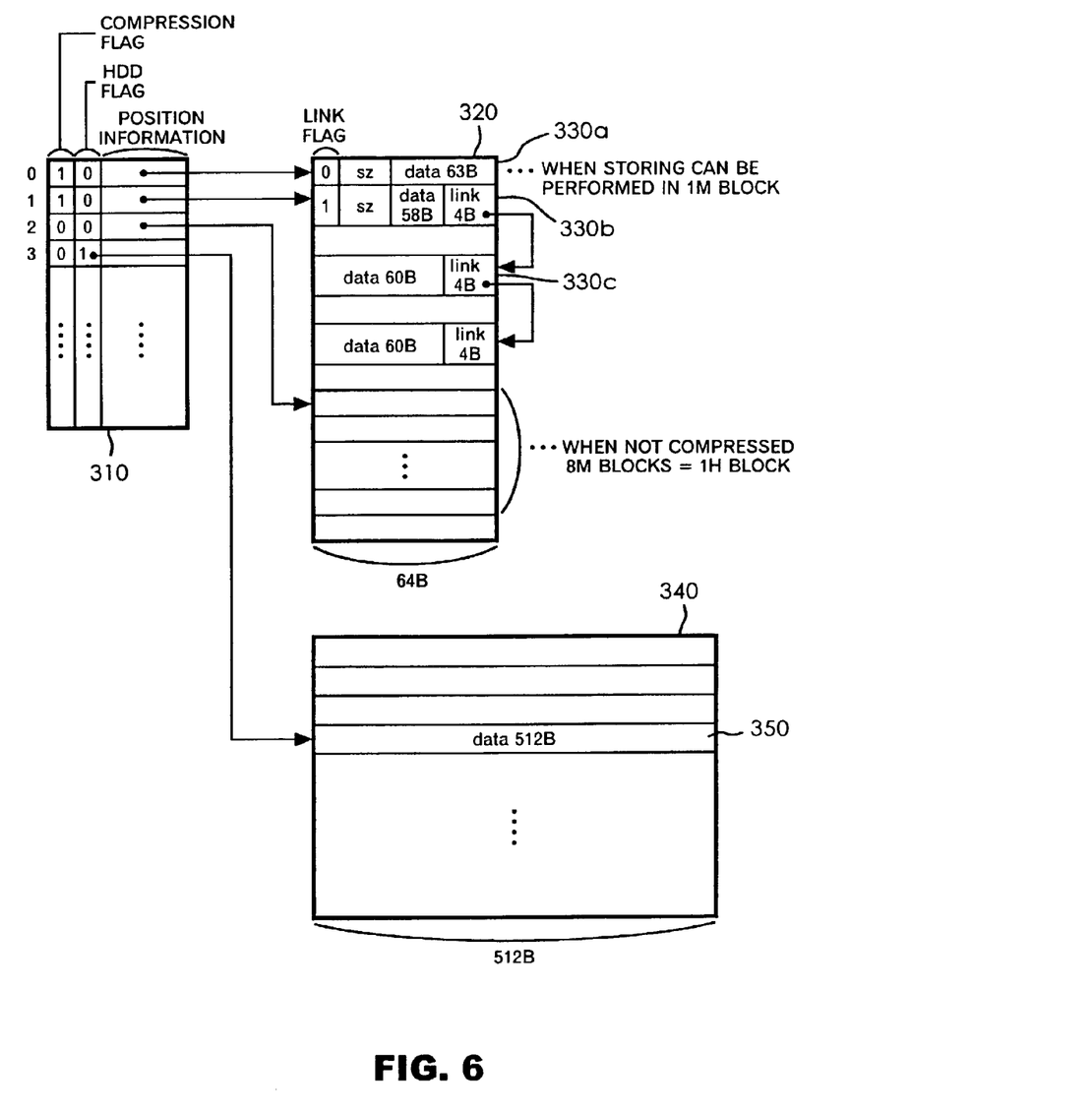
FIG. 6 is an example of a storage form of data stored in the external storage device.

FIG. 6 shows an example of a storage form of data stored in the external storage device 110, in accordance with a preferred embodiment of the present invention. The position table 310 stores a compression flag, an HDD flag, and position information for each block of the external storage device 110. The compression flag stores "0" in the case when an object data block is compressed and is not stored, and stores "1" in the case when it is compressed and is stored. The HDD flag stores "0" in the case when the object data block is stored in the semiconductor memory 200, and stores "1" in the case when it is stored in the hard disk 210. When the object data block is stored in one or more M blocks, the position information stores the number of the first M block. But when the object data block is stored in the H block, the object data block is stored in the H block specified by the block number on the position table 310.

The position table 310 stores information indicating a storage position of an object data block, which is made to correspond to each of object data blocks obtained by division in a unit of an H block. When the object data block is stored in the semiconductor memory 200, the storage part 290 stores information indicating the positions of the M blocks for storing the object data block, that is, the HDD flag and the position information in the position table 310. But when the object data block is stored in the hard disk 210, the storage part 290 stores information indicating the position of the H block for storing the object data block, that is, the HDD flag into the position table 310.

The storage part 290 stores the object data block by using one of four following methods.

Method 1: Object Data Block is Compressed and is Stored by Using One M Block

When the size of the object data block becomes 63 bytes or less as the result of compression, the allocation part 285 and the storage part 290 store the object data block by using one M block. In this case, the storage part 290 stores the data by using the M block in a form shown as an M block 330a.

The M block 330a includes a link flag of 1 bit, a size field of 7 bits, and a data field of 63 B. The link flag is a flag becoming "1" in the case where the M block has link information indicating a subsequent M block. Since the M block 330a has no link information, the leading 1 bit is "0". The size field (sz in FIG. 6) indicates a size (0 to 63 bytes) of the object data block after compression. A data field (data in the drawing) is a storage area of the object data block.

Method 2: Object Data Block is Compressed and is Stored by Using Two or More M Blocks When the size of the object data block becomes 64 bytes or more as the result of compression, the allocation part 285 and the storage part 290 store the object data block by using two or more M blocks. In this case, the storage part 290 stores the data in the M blocks in forms shown as an M block 330b and an M block 330c.

The M block 330b is the M block corresponding to the beginning of the object data block. The M block 330b includes a link flag of 1 bit, a size field of 9 bits, a data field of 58 bytes, and link information of 4 bytes. The link flag is a flag similar to the link flag in the above method 1. Since the M block 330b has the link information, the leading 1 bit is "1". The size field (sz in FIG. 6) indicates the size (0 to 512 bytes) of the object data block after compression. The data field (data in FIG. 6) is a storage area of data of the object data block. The link field (link in FIG. 6) indicates the number of a subsequent M block.

The M block 330c is an M block corresponding to a second or the following of the object data block. The M block 330c includes a data field of 60 bytes and link information of 4 bytes. The data field (data in FIG. 6) is a storage area of the object data block. The link field (link in FIG. 6) indicates the number of a subsequent M block.

As stated above, when the object data block is stored by using two or more M blocks, the storage part 290 stores M blocks, the number of which corresponds to the size of the object data block after compression shown in the size field, as a one-way list using the link information. That is, when the object data block is stored in the semiconductor memory 200 by using two or more M blocks, the storage part 290 stores the information indicating the position of the first M block for storing the object data block into the position table 310, and stores the link information as the information indicating the position of a subsequent M block of each M block into each of plural M blocks for storing the object data block.

Method 3: Object Data Block is Not Compressed and is Stored by Using Eight M Blocks When the compression part 280 does not compress the object data block, the allocation part 285 and the storage part 290 store the object data block by using eight continuous M blocks.

Method 4: Object Data Block is Not Compressed and is Stored by Using One H Block When the judgment part 275 determines that the object data block is stored in the hard disk 210, the allocation part 285 and the storage part 290 store the object data block in the H block specified by the write access. That is, when receiving, for example, a write access of writing an object data block into block 3 of the external storage device 110, the allocation part 285 and the storage part 290 store the object data block in a third H block 350.

Corresponding to the storage methods of the object data block described above, the storage part 290 and the restoration part 297 read out the object data block by using one of following four methods.

Method 1: With Respect to a Readout Object Block, Compression Flag=1, HDD Flag=0, Link Flag=0

The storage part 290 reads out one M block specified by the position information in the position table 310 corresponding to the readout object block from the semiconductor memory 200. The restoration part 297 restores the object data block read out by the storage part 290 and transmits it to the computer 120.

Method 2: With Respect to a Readout Object Block, Compression Flag=1, HDD Flag=0, Link Flag=1

The storage part 290 reads out plural M blocks specified by the position information in the position table 310 corresponding to the readout object block from the semiconductor memory 200 on the basis of the link information. The restoration part 297 restores the object data block read out by the storage part 290 and transmits it to the computer 120.

Method 3: With Respect to a Readout Object Block, Compression Flag=0 and HDD Flag=0

The storage part 290 reads out eight continuous M blocks specified by the position information of the position table 310 corresponding to the readout object block from the semiconductor memory 200. The restoration part 297 transmits the object data block read out by the storage part 290 to the computer 120.

Method 4: With Respect to a Readout Object Block, HDD Flag=1

The storage part 290 reads out the H block corresponding to the readout object block from the hard disk 210. The restoration part 297 transmits the object data block read out by the storage part 290 to the computer 120.

Figure 7:
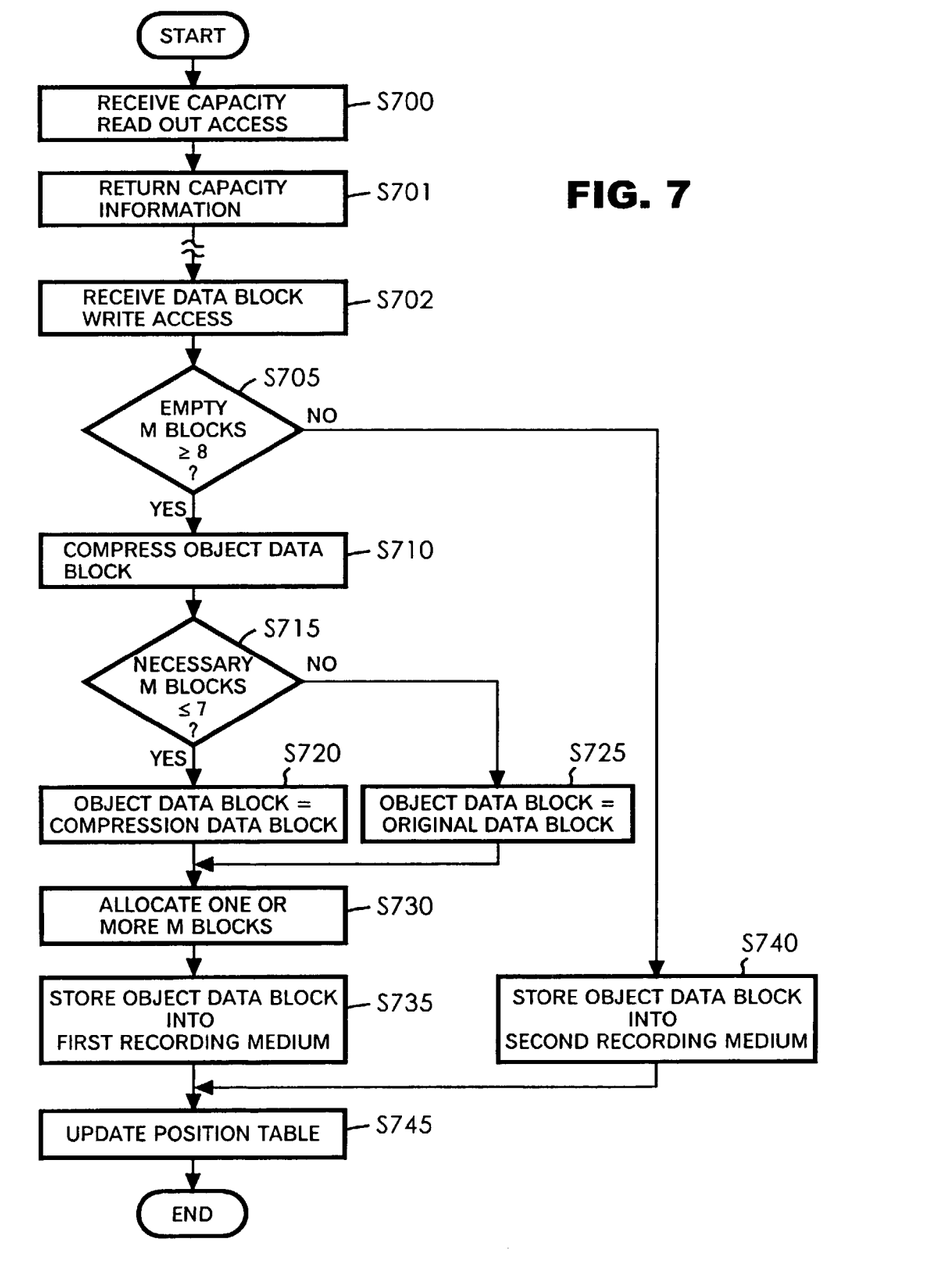
FIG. 7 is a high-level logic flow diagram of a data write process within an external storage device, according to a preferred embodiment of the present invention.

FIG. 7 is a high-level logic flow diagram of a data write processing of the external storage device 110, in accordance with a preferred embodiment of the present invention. The computer 120 transmits a capacity readout access to the external storage device 110 at the time of starting or the time of connection of the external storage device 110. The capacity management part 247 receives the capacity readout access through the network 140 and the communication interface 245 (S700). Next, the capacity management part 247 returns the capacity information indicating the storage capacity of the external storage device 110 to the computer 120 (S701).

Next, the judgment part 275 receives a write access from the computer 120 through the network 140 and the communication interface 245 (S702). Next, the judgment part 275 checks whether the number of empty M blocks of the semiconductor memory 200 is eight or more (S705). When the number of empty M blocks of the semiconductor memory 200 is less than eight, the judgment part 275 concludes that the object data block is stored in the hard disk 210. Then, the storage part 290 acquires the object data block through the compression part 280 and the allocation part 285, and stores it in the H block corresponding to the block number specified by the write access from the computer 120 (S740).

But when the number of empty M blocks of the semiconductor memory 200 is eight or more, the judgment part 275 concludes that the object data block is stored in the semiconductor memory 200. Next, the compression part 280 acquires the object data block from the judgment part 275 and compresses it (S710). Next, the compression part 280 determines whether the number of M blocks required for storing the compressed object data block is seven or less (S715). When the number of M blocks required for storing the compressed object data block is seven or less, the compression part 280 makes the compressed object data block the object data block to be stored in the semiconductor memory 200 (S720). But when the number of M blocks required for storing the compressed object data block is eight or more, the compression part 280 makes the original object data block the object data block to be stored in the semiconductor memory 200 (S725).

Next, the allocation part 285 acquires the object data block from the compression part 280, divides it into M blocks the number of which corresponds to the object data block, and allocates these M blocks (S730). Next, the storage part 290 stores the object data block into the M blocks the number of which is allocated by the allocation part 285 (S735). Next, the storage part 290 updates the position table 310 on the basis of the processing contents of S735 or S740 (S745).

Figure 8:
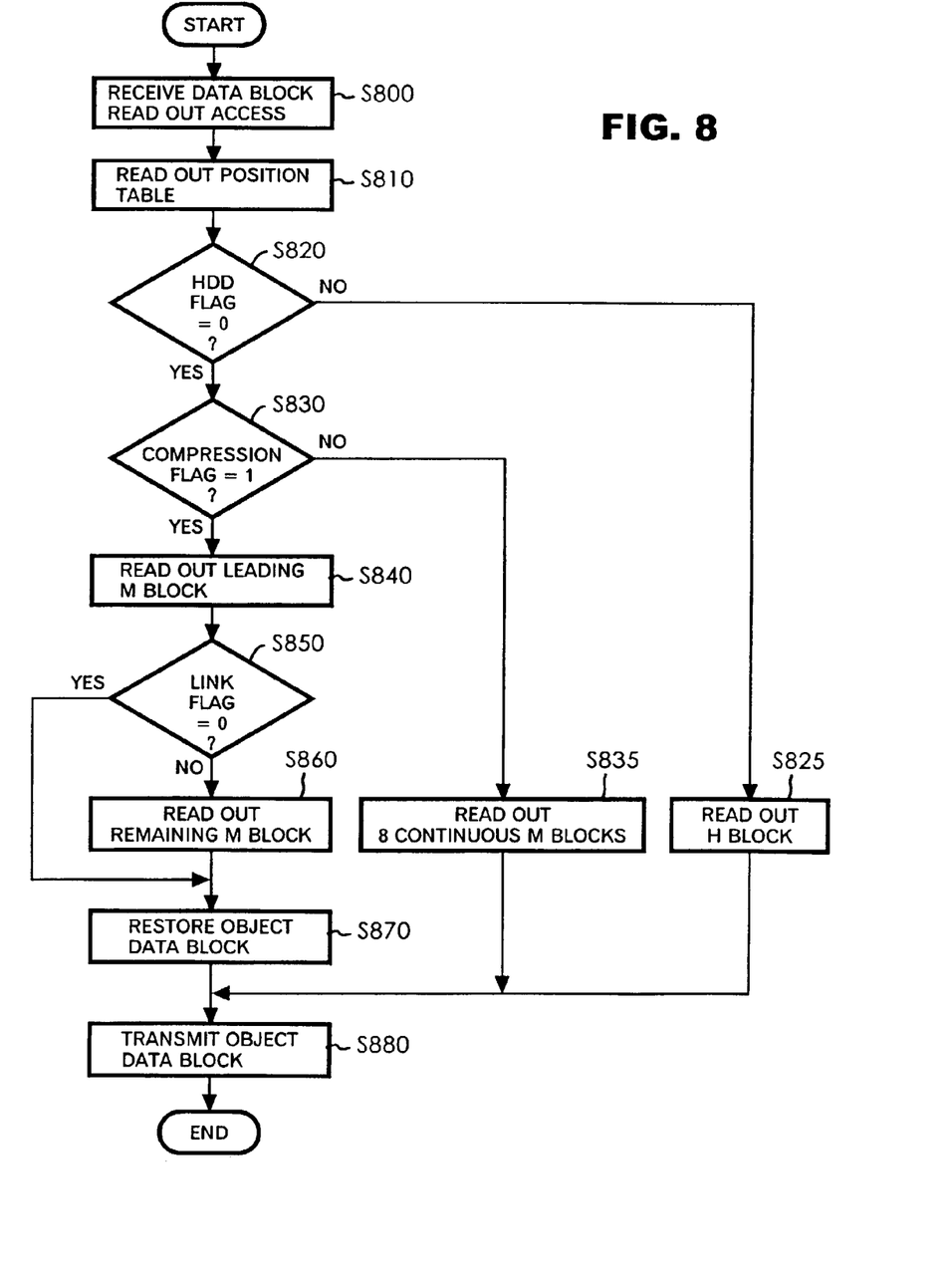
FIG. 8 is a high-level logic flow diagram of a data readout process within an external storage device, according to a preferred embodiment of the present invention.

FIG. 8 is a high-level logic flow diagram of a data readout processing of the external storage device 110, in accordance with a preferred embodiment of the present invention. First, the storage part 290 receives a readout access from the computer 120 through the network 140 and the communication interface 245 (S800). Next, the storage part 290 reads out the information indicating the storage position of the object data block of the readout access from the position table 310 on the semiconductor memory 200 (S810). Next, the storage part 290 determines whether or not the HDD flag concerning the object data block is "0" (S820). When the HDD flag is not "0", the storage part 290 reads out the object data block from the hard disk 210 (S835). Then, the storage part 290 transfers the object data block to the restoration part 297, and causes the restoration part 297 to perform a processing of S880. When the HDD flag is "1" at S820, the storage part 290 determines whether or not the compression flag concerning the object data block is "1" (S830). When the compression flag is not "1," the storage part 290 reads out eight continuous M blocks specified by the position information from the semiconductor memory 200, and acquires the object data block (S835). Then, the storage part 290 transmits the object data block to the restoration part 297 and causes the restoration part 297 to perform the processing of S880. But when the compression flag is "0" (S830), the storage part 290 reads out the leading M block specified by the position information (S840). Then, the storage part 290 determines whether or not the link flag of the leading M block is "0" (S850).

When the link flag is "0," the storage part 290 regards the M block acquired at S840 as the object data block and transfers it to the restoration part 297. When the link flag is "1" (S850), the storage part 290 reads out plural M blocks included in the one-way list on the basis of the size field of the leading M block and the link field of each M block (S860). The storage part 290 regards the plural read out M blocks as the object data block, and transfers them to the restoration part 297. Next, the restoration part 297 restores the object data block transferred from the storage part 290 at S850 or S860 (S870). Next, the restoration part 297 transmits the object data block obtained through the communication interface 245 by performing the processing of S825, S835 or S870 to the computer 120 through the communication interface 245 (S880).

Figure 9:
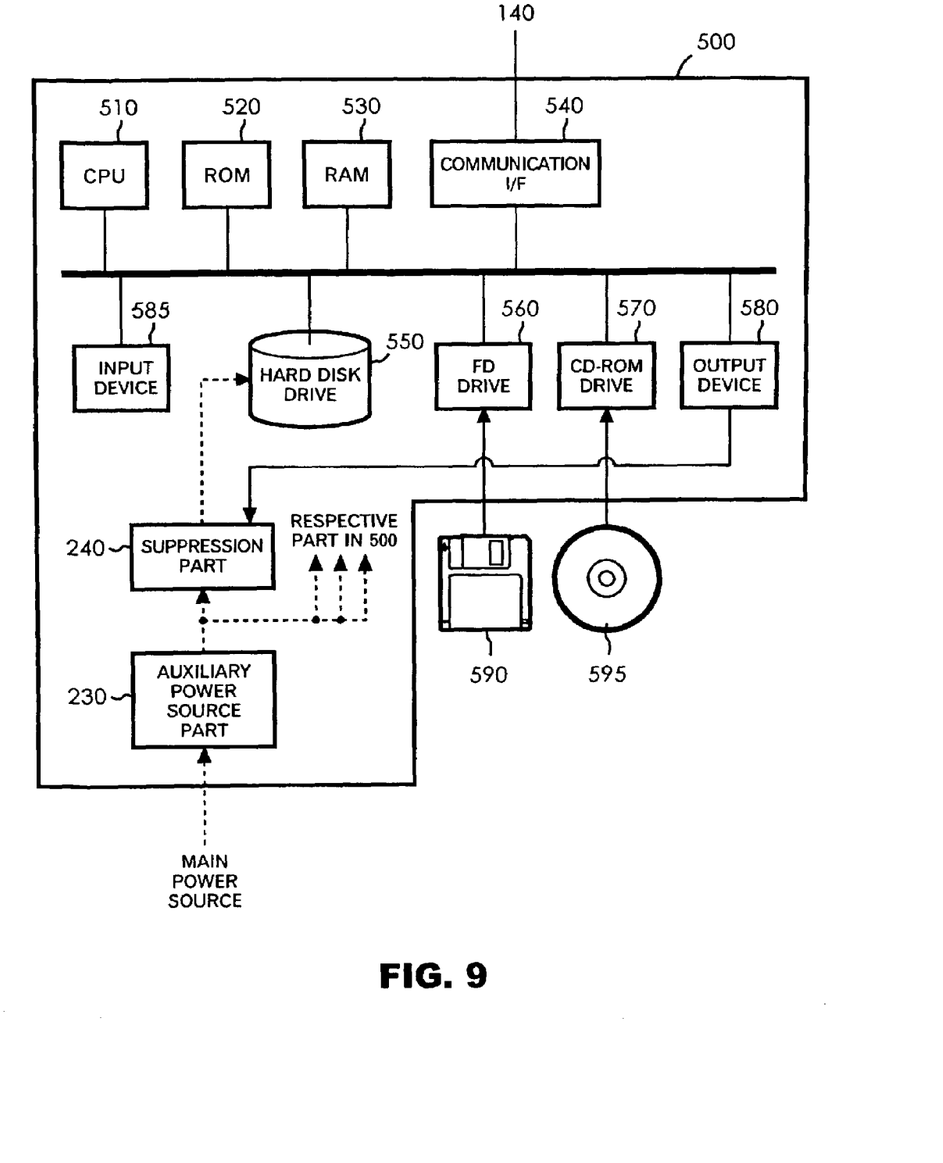
FIG. 9 is a block diagram of a hardware structure of an external storage device, according to a preferred embodiment of the present invention.

FIG. 9 shows an example of a hardware structure of the external storage device 110, in accordance with a preferred embodiment of the present invention. The functions of the external storage device 110 of the present embodiment are realized by the cooperation of a computer 500 including a central processing unit (CPU) 510, a read-only memory (ROM) 520, a random access memory (RAM) 530, a communication interface 540, a hard disk drive 550, an output device 580, an input device 585, the auxiliary power source part 230, and the suppression part 240, and the program executed on the computer 500. The computer 500 may further include a floppy drive 560 and/or a CD-ROM drive 570.

The program realizing the external storage device 110 includes a communication interface module, an auxiliary power source module, a suppression module, a notification module, a display module, a sound source module, a status register module, a trap generation module, a diagnosis module, a judgment module, and an access processing module. The above-mentioned modules are programs for operating the computer 500 as the communication interface 245, the auxiliary power source part 230, the suppression part 240, the notification part 255, the display part 260, the sound source part 265, the status register 267, the trap generation part 269, the diagnosis part 270, the judgment part 275, and the access processing part 277. The access processing module includes a compression module, an allocation module, a storage module, a transfer module, and a restoration module. The above-mentioned modules are programs for operating the computer 500 as the compression part 280, the allocation part 285, the storage part 290, the transmission part 295, and the restoration part 297.

The programs or modules described above may be stored in an external storage medium. As the recording medium, in addition to the floppy disk 590 and the CD-ROM 595, an optical recording medium such as a DVD or a PD, a magneto-optical recording medium such as an MD, a tape medium, or a semiconductor memory such as an IC card can be used. In addition, a storage device, such as a hard disk or a RAM, provided in a server system connected to a dedicated communication network or the Internet may be used as the recording medium to provide the program to the computer 500 through the network 140.

As described above, the external storage device 110 of the present embodiment includes the semiconductor memory 200 having a relatively small storage capacity and the hard disk 210 having a relatively large storage capacity. Such an external storage device can be accessed as a large-capacity hard disk with a specific storage capacity from an external computer. Also, since many blocks stored in the external storage device are compressed and stored in the semiconductor memory 200, the external storage device 110 can realize an access speed close to the semiconductor memory 200.

With the external storage device 110 of the present embodiment, it is possible to provide the notification part 255 for giving notice that the consumption of the semiconductor memory 200 exceeds a predetermined value. The external storage device 110 can notify the administrator of the external storage device 110 that the external storage device 110 almost consumes the entire semiconductor memory 200, and can notify the user of the external storage device 110 that there is a possibility that the access speed will be lowered.

With the external storage device 110 of the present embodiment, a method of storing an object data block by using the semiconductor memory 200 and the hard disk 210 different from each other in the block size is provided. The external storage device 110 can store the object data block after selecting whether it should be stored into M blocks, the number of which corresponds to the contents of the object data block, or into one H block. Such function produces an effect to raise the use efficiency of the storage area by storing, for example, data of less than 512 bytes at an end of a file into the semiconductor memory 200 with priority even in a case where the access speed of the semiconductor memory 200 is equal to that of the hard disk 210.

With the external storage device 110 of the present embodiment, even at the time of abnormality of the main power source, it is possible to reduce the likelihood of the disappearance of the contents within the semiconductor memory 200.

The external storage device 110 of the present embodiment realizes the function suitable for using an external storage device having a recording medium of a semiconductor memory as a substitution of an external storage device having a recording medium of a hard disk. As such, the external storage device 110 of the present embodiment has the advantages of both a hard disk and a semiconductor memory.

While the invention has been particularly shown and described with reference to a preferred embodiment, it will be understood by those skilled in the art that various changes in form and detail may be made therein without departing from the spirit and scope of the invention.

What is claimed is:

1. An external storage device, comprising:
    a storage medium;
    a second storage medium having an access speed lower than said first storage medium, wherein said second storage medium includes a backup storage area capable of storing data from said first storage medium;
    judgment means for determining, in response to a write access to said external storage device, whether or not data from said write access can be stored in said first storage medium;
    access processing means for compressing and storing said data from said write access into said first storage medium when said data can be stored in said first storage medium, and for storing said data into said second storage medium when said data cannot be stored in said first storage medium; and
    transfer means for transferring data from said first storage medium to said backup storage area in said second storage medium in response to a power outage or abnormality occurred in said extornal storage device and said second storage medium operates normally, and for transferring said data from said backup storage area back to said first storage medium in response to a power restoration on said external storage device after said power outage or abnormality, wherein power consumption of said second storage medium is suppressed when in response to said power outage or abnormality and said second storage medium does not normally operate.

2. The external storage device of claim 1, further comprises capacity management means for returning, in response to a request for storage capacity information of said external storage device, said storage capacity information indicating a storage capacity larger than a storage capacity of said first recording medium.

3. The external storage device of claim 2, wherein said capacity management means returns said storage capacity information indicating a capacity of an area on said second recording medium used for storing data from said write access.

4. The external storage device of claim 1, wherein said first storage medium is a volatile storage medium and said second storage medium is a non-volatile storage medium.

5. The external storage device of claim 1, wherein said access processing means further includes means for determining, in response to a readout access, whether data from said readout access is stored in said first recording medium or said second recording medium, and for reading out said readout data from said first recording medium and restoring said readout data when said readout data is stored in said first recording medium, and for reading out said readout data from said second recording medium when said readout data is stored in said second recording medium.

6. The external storage device of claim 5, wherein said access processing means includes a transfer part for compressing data stored in said second storage medium and for storing said compressed data into said first storage medium if an empty area exists in said first storage medium.

7. The external storage device of claim 1, further comprises an auxiliary power source part for supplying electric power to said first storage medium in case when an abnormality occurs in a main power source of said external storage device.

* * * * *